(12) United States Patent
Harada et al.

(10) Patent No.: US 10,982,065 B2
(45) Date of Patent: Apr. 20, 2021

(54) OPTICAL FILM, METHOD FOR MANUFACTURING THE SAME, OPTICAL BARRIER FILM AND COLOR CONVERSION FILM

(71) Applicant: TOPPAN PRINTING CO., LTD., Tokyo (JP)

(72) Inventors: Genki Harada, Tokyo (JP); Kenji Muneuchi, Tokyo (JP); Hayato Ida, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/719,704

(22) Filed: Sep. 29, 2017

(65) Prior Publication Data

US 2018/0024278 A1 Jan. 25, 2018

Related U.S. Application Data

(63) Continuation of application No. PCT/JP2016/056648, filed on Mar. 3, 2016.

(30) Foreign Application Priority Data

Mar. 30, 2015 (JP) ............................. JP2015-069275
Oct. 19, 2015 (JP) ............................. JP2015-205590

(51) Int. Cl.
*C08J 7/04* (2020.01)
*B32B 27/18* (2006.01)
(Continued)

(52) U.S. Cl.
CPC .............. *C08J 7/0427* (2020.01); *B05D 5/02* (2013.01); *B32B 7/02* (2013.01); *B32B 27/18* (2013.01);
(Continued)

(58) Field of Classification Search
CPC .. G02B 1/16; G02B 5/20; G02B 6/005; B32B 27/18; B32B 7/02
See application file for complete search history.

(56) References Cited

U.S. PATENT DOCUMENTS 4,623,589 A * 11/1986 Simmonds, Jr. ........ B29C 33/64
428/403
5,312,671 A 5/1994 Atherton et al.
(Continued)

FOREIGN PATENT DOCUMENTS

| CN | 101265334 A | 9/2008 |
|---|---|---|
| CN | 102565893 A | 7/2012 |

(Continued)

OTHER PUBLICATIONS

International Search Report Issued in International Patent Application No. PCT/JP2016/056648 dated May 24, 2016.
(Continued)

*Primary Examiner* — Alicia J Sawdon
(74) *Attorney, Agent, or Firm* — Foley & Lardner LLP

(57) ABSTRACT

An optical film including: a film base material; and a matte layer formed on one surface of the film base material, wherein the matte layer is formed from a resin composition containing a polyol resin (A), an isocyanate-based curing agent (B) and an antistatic agent having a hydroxyl group (C).

4 Claims, 6 Drawing Sheets

(51) Int. Cl.
  *B32B 7/02* (2019.01)
  *G02B 1/16* (2015.01)
  *G02B 5/20* (2006.01)
  *F21V 9/40* (2018.01)
  *F21V 13/14* (2006.01)
  *B05D 5/02* (2006.01)
  *F21V 8/00* (2006.01)

(52) U.S. Cl.
  CPC ............... *F21V 9/40* (2018.02); *F21V 13/14* (2013.01); *G02B 1/16* (2015.01); *G02B 5/20* (2013.01); *C08J 2367/02* (2013.01); *C08J 2475/04* (2013.01); *G02B 6/005* (2013.01)

(56) References Cited

U.S. PATENT DOCUMENTS

| | | | |
|---|---|---|---|
| 2008/0226888 A1 | 9/2008 | Kawanishi et al. | |
| 2011/0183110 A1* | 7/2011 | Yamazaki | G02B 1/04 428/141 |
| 2012/0258295 A1* | 10/2012 | Leyder | C03C 17/42 428/212 |
| 2014/0056024 A1* | 2/2014 | Kim | G02B 6/003 362/608 |
| 2014/0106131 A1* | 4/2014 | Ikai | G06F 3/041 428/172 |
| 2015/0126659 A1* | 5/2015 | Pokorny | C09D 133/04 524/318 |
| 2015/0203718 A1 | 7/2015 | Hosoda et al. | |

FOREIGN PATENT DOCUMENTS

| | | |
|---|---|---|
| CN | 103197363 A | 7/2013 |
| EP | 2 700 998 A1 | 2/2014 |
| JP | 2003-270410 A | 9/2003 |
| JP | 2004-198707 | 7/2004 |
| JP | 2006-049657 | 2/2006 |
| JP | 3790571 B2 | 6/2006 |
| JP | 2007-011317 A | 1/2007 |
| JP | 2007-256802 A | 10/2007 |
| JP | 4227436 | 2/2009 |
| JP | 2009-173722 | 8/2009 |
| JP | 2009173722 A * | 8/2009 |
| JP | 2009-231273 A | 10/2009 |
| JP | 2010-164690 A | 7/2010 |
| JP | 2010-528118 | 8/2010 |
| JP | 2012-108438 | 6/2012 |
| JP | 2013-189562 | 9/2013 |
| JP | 5323709 B2 | 10/2013 |
| JP | 2013-544018 | 12/2013 |
| JP | 2014-040572 A | 3/2014 |
| JP | 2014-069554 A | 4/2014 |
| JP | 2014-145902 A | 8/2014 |
| JP | 2014-159124 | 9/2014 |
| KR | 20100102290 A | 9/2010 |
| WO | WO-2009-031598 | 3/2009 |

OTHER PUBLICATIONS

Database WPI XP002782884.
Database WPI XP002782885.
Extended European Search Report dated Jul. 17, 2018 in corresponding application No. 16772076.2.
Cha et al, "English Translation of JP2014040572A," EPO (Year: 2014).
Chinese Office Action for corresponding App. No. 201680017334.7 dated Jul. 22, 2019.
Extended European Search Report dated Jun. 12, 2018 in corresponding application No. 15858840.0.
International Search Report for International Patent Application No. PCT/JP2015/081637 dated Feb. 16, 2016.
Shimizu et al, "English Translation of JP2014145902A," EPO (Year:2014).
Yoshida et al, "English Translation of JP2007256802A," EPO (Year: 2007).
Taiwanese Office Action dated Oct. 28, 2019 for corresponding Application No. 105109961.

* cited by examiner

OPTICAL FILM, METHOD FOR MANUFACTURING THE SAME, OPTICAL BARRIER FILM AND COLOR CONVERSION FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/056648, filed on Mar. 3, 2016, which is based upon and claims the benefit of priority of Japanese Patent Application No. 2015-069275, filed on Mar. 30, 2015, and Japanese Patent Application No. 2015-205590, filed on Oct. 19, 2015, the entireties of which are hereby incorporated by reference.

TECHNICAL FIELD

The present invention relates to an optical film, a method for manufacturing the same, an optical barrier film obtained by using the optical film, and a color conversion film.

BACKGROUND

Recently, improvement of the lightness and contrast ratio of color filters, and the use of a backlight which uses light emitting diodes has been attempted to improve the color gamut and reduce the power consumption and the like of a liquid crystal display (for example, PTL 1).

Methods for the generation of white light by backlight units which use light emitting diodes include a method which uses a light emitting diode having the three colors: red, green, and blue to synthesize white light, and a method for converting a blue light obtained by using a blue light emitting diode to white light by passing it through a color conversion material.

When, for example, a GaN-based blue light emitting diode chip is used to convert blue light to white light, YAG phosphors can be used as the color conversion material (for example, see PTL 2).

However, the white light converted using the YAG phosphors has a wide emission spectrum and the match with a liquid crystal color filter is poor, thus, the color gamut is narrow, and the power consumption is not low.

With respect to these phosphors, recently, improvement of the color gamut and reduction of power consumption is ensured by using core-shell luminescent nanocrystals as the color conversion material (see, for example, PTL 3).

The core-shell luminescent nanocrystals are incorporated in a backlight unit as a color conversion film by mixing with a binder resin and coating the mixture on a transparent substrate.

However, the color conversion material made of the core-shell luminescent nanocrystals suffers oxidative damage due to air and moisture, which results in the deterioration of the optical conversion performance.

Therefore, the color conversion film which uses the core-shell luminescent nanocrystals requires a barrier layer for protecting the core-shell luminescent nanocrystals from air and moisture.

Further, in a backlight unit, this kind of color conversion film is often arranged between a light guide plate and a prism sheet, but when a foreign material such as dust is present between these members in the manufacturing process of the backlight unit, flaws and defects are likely to occur. In order to prevent defects associated with the adhesion of foreign material such as dust, it is necessary to impart antistatic properties to the members.

For example, as a method for imparting an antistatic performance to members used in a backlight unit, providing an antistatic agent within the polymer composition constituting the optical layer in the optical sheet in which an optical layer is laminated on the surface of a transparent substrate layer has been proposed (see, for example, PTL 4). Further, forming an antistatic layer by coating the antistatic agent on the surface and/or the back surface of an optical diffusion sheet has been proposed (see for example, PTL 5).

CITATION LIST

Patent Literature

PTL 1: JP 2012-108438 A
PTL 2: JP 2006-49657 A
PTL 3: JP 2010-528118 A
PTL 4: JP 2004-198707 A
PTL 5: JP 4227436 B

SUMMARY OF THE INVENTION

Technical Problem

However, when forming the antistatic layer containing the antistatic agent within the polymer composition as stated above, there is the risk that the antistatic agent will excessively bleed on the antistatic layer surface under a high temperature and high humidity environment, and appearance defects or the transfer of the antistatic agent to another member may occur. On the one hand, if the amount of the antistatic agent is reduced within the polymer composition, the excessive bleed under a high temperature and high humidity environment tends to be solved, but a sufficient antistatic effect cannot be obtained. Further, forming another antistatic layer on the optical film surface is not preferable as it increases the number of film manufacturing processes, and leads to an increase in the cost.

In view of these circumstances, it is an object of the present invention to provide an optical film that achieves a sufficient antistatic effect while suppressing excessive bleeding of the antistatic agent under a high temperature and high humidity environment, a method for manufacturing the optical film, an optical barrier film and a color conversion film obtained by using the optical film.

Solution to Problem

The present invention provides an optical film including: a film base material; and a matte layer formed on one surface of the film base material, wherein the matte layer is formed from a resin composition containing a polyol resin (A), an isocyanate-based curing agent (B) and an antistatic agent having a hydroxyl group (C). The optical film has excellent antistatic properties, and thus, can suppress the excessive bleeding of the antistatic agent under a high temperature and high humidity environment.

The isocyanate-based curing agent (B) is preferably a xylylene diisocyanate-based compound. By the isocyanate-based curing agent (B) being a xylylene diisocyanate-based compound, the adhesion and the light-fastness of the film base material and the matte layer tends to improve in a well-balanced manner.

The resin composition preferably further contains fine particles (D). Further, the antistatic agent having a hydroxyl group (C) preferably includes a quaternary ammonium salt.

A surface resistivity of the matte layer is preferably $1.0\times10^{13}$ Ω/sq. or less.

The present invention further provides an optical barrier film including: the optical film; and a vapor deposition film layer disposed on a surface of the optical film opposite to the surface facing the matte layer of the film base material, wherein the vapor deposition film layer contains a metal oxide. The metal oxide preferably includes silicon oxide.

The present invention further provides a color conversion film including: a color conversion layer; and a pair of optical barrier films formed on opposite surfaces of the color conversion layer, wherein at least one of the optical barrier films is the optical barrier film provided by the present invention.

The present invention further provides a method for manufacturing the optical film including the steps of: coating the resin composition on a film base material, the resin composition containing the polyol resin (A), the isocyanate-based curing agent (B) and the antistatic agent having a hydroxyl group (C); and heating the resin composition after coating to form a matte layer on the film base material.

Advantageous Effects of the Invention

The present invention can provide an optical film that achieves a sufficient antistatic effect while suppressing or even eliminating excessive bleeding of the antistatic agent under a high temperature and high humidity environment, a method for manufacturing the optical film, an optical barrier film and a color conversion film obtained by using the optical film.

DESCRIPTION OF REPRESENTATIVE EMBODIMENTS

Figure 1:
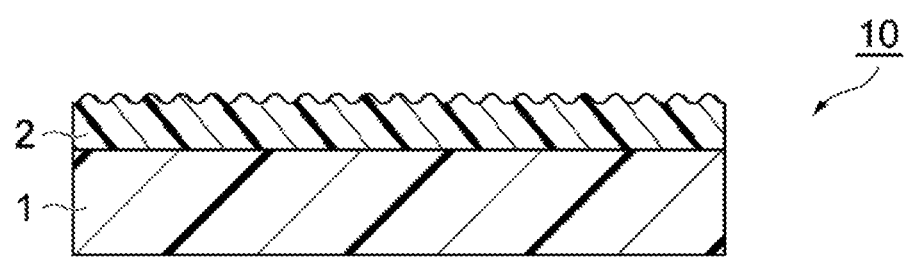
FIG. 1 is a schematic cross-sectional view of the optical film according to an embodiment of the present invention.

The preferred embodiments of the invention will be described below in detail with reference to the drawings. Note that, in the drawings, the same or equivalent components are represented by the same reference numerals, and overlapping descriptions will be omitted. Further, although the description has been made with reference to a limited number of embodiments, the scope of the invention is not limited thereto, and modifications of the above embodiments on the basis of the above disclosure is obvious to a person having ordinary skill in the art. That is, the present invention may not be limited to the aforementioned embodiments. Design modifications or the like can also be made to the above embodiments on the basis of a knowledge of a skilled person in the art, and such modifications or the like without departing from the principle of the present invention are encompassed within the scope of the present invention.

[Optical Film]

FIG. 1 is a schematic cross-sectional view of the optical film according to an embodiment of the present invention. In FIG. 1, an optical film 10 is provided with a film base material 1 and a matte layer 2 formed on one surface of the film base material 1. The matte layer 2 has an unevenness on the surface, and can scatter light from a light source.

Furthermore, the matte layer 2 is formed from a resin composition containing a polyol resin (A), an isocyanate-based curing agent (B) and an antistatic agent having a hydroxyl group (C) (hereinafter, referred to simply as Component (A), Component (B) and Component (C)). By forming the matte layer from the resin composition containing the antistatic agent, antistatic properties can be imparted to the matte layer. Further, the Component (C) has a hydroxyl group, thus, the isocyanate group remaining in the reaction of Component (A) and Component (B) is bound to the hydroxyl group of Component (C), and Component (C) can be fixed to the product of Component (A) and Component (B). As a result, even if the optical film is exposed for a long period of time under a high temperature and high humidity environment, it is possible to suppress the antistatic agent from excessively bleeding to the matte layer 2 (the optical film 10) surface.

By forming the matte layer 2 on the film base material 1, a sufficient antistatic effect can be obtained, and excessive bleeding of the antistatic agent under a high temperature and high humidity environment can be suppressed. Further, when the optical film 10 is used as a member of a backlight unit, blocking of the member facing the matte layer 2 can be prevented.

Polyol Resin (A)

The polyol resin is a resin having a plurality of hydroxyl groups. For example, polyether resin, polyester resin, polycarbonate resin, polycaprolactone resin, acrylic resin, epoxy resin, cellulose resin, acetal resin, polyethylene resin, polystyrene resin, polyamide resin, polyimide resin, melamine resin, phenol resin, silicone resin and the like can be used as the polyol resin. Among these, an acrylic resin is preferably used because of its excellent optical transparency.

The acrylic polyol resin is preferably a copolymer of a monomer component containing at least one acrylic monomer having hydroxyl groups. Hydroxyethyl acrylate, hydroxyethyl methacrylate, hydroxypropyl acrylate, hydroxypropyl methacrylate and the like may be provided as the acrylic monomer having hydroxyl groups. Further, the monomer component may further contain a (meth) acrylic monomer such as methyl methacrylate, butyl methacrylate, lauryl methacrylate, methyl acrylate, ethyl acrylate, butyl acrylate, isobutyl acrylate, 2-ethylhexyl acrylate, acrylic acid, methacrylic acid, acrylamide, methacrylamide, N-methylol acrylamide, glycidyl acrylate, and glycidyl methacrylate; styrene, acrylonitrile and the like.

The weight average molecular weight of the polyol resin is preferably 1,000 to 100,000, and more preferably 5,000 to 50,000. By the weight average molecular weight of the polyol resin being 1000 or greater, as stated above, when Component (C) was reacted with the product of Component (A) and Component (B), the bleeding tends to be further suppressed. By the weight average molecular weight of the polyol resin being 100,000 or less, the handling of the resin composition tends to become easy.

The hydroxyl value of the polyol resin is preferably 5 to 1,000, and more preferably 10 to 500. By the hydroxyl value of the polyol resin being 5 or greater, the reaction with Component (B) easily progresses, and the adhesion between the film base material 1 and the matte layer 2 tends to improve. By the hydroxyl value of the polyol resin being 1,000 or less, there is the tendency that cracks and the like in the matte layer 2 can be suppressed.

Isocyanate-Based Curing Agent (B)

The isocyanate-based curing agent has an isocyanate group which can react with the hydroxyl group of the polyol resin, and the polyol resin can be cured. An aromatic isocyanate or a derivative thereof, and, an aliphatic isocyanate or a derivative thereof are preferably used as the isocyanate-based curing agents. When the isocyanate-based curing agent is an aromatic isocyanate or a derivative thereof, there is the tendency that an even higher adhesion between the film base material 1 and the matte layer 2 can be obtained. However, when the isocyanate-based curing agent is an aliphatic isocyanate or a derivative thereof, the light-fastness of the matte layer 2 tends to improve.

In the disclosure, the aromatic isocyanate is a hydrocarbon compound having an aromatic ring and an isocyanate group directly bound to the aromatic ring. For example, a toluene diisocyanate compound, a diphenylmethane diisocyanate compound and the like can be provided as the aromatic isocyanate or a derivative thereof. In the disclosure, the aliphatic isocyanate is a hydrocarbon compound having an aliphatic hydrocarbon group and an isocyanate group directly bound to the aliphatic hydrocarbon group, and is a different compound from the aromatic isocyanate. The aliphatic isocyanate may have an aromatic ring which is not bound with the isocyanate group. When the isocyanate-based curing agent is an aliphatic isocyanate and the aliphatic isocyanate has an aromatic ring, there is the tendency that the effect of the adhesion and the effect of the improvement of the light-fastness can be obtained in a well-balanced manner.

For example, a hexamethylene diisocyanate compound, an isophorone diisocyanate compound and the like can be provided as the aliphatic isocyanate having no aromatic ring or a derivative thereof. Further, for example, a xylylene diisocyanate-based compound, a tetramethyl xylylene diisocyanate-based compound and the like can be provided as an aliphatic isocyanate having an aromatic ring or a derivative thereof. The isocyanate-based curing agent preferably has two or more isocyanate groups. By the isocyanate-based curing agent having two or more isocyanate groups, the polyol resin and the antistatic agent are bound via the isocyanate-based curing agent, and there is the tendency that bleeding of the antistatic agent can be further suppressed. From the above-mentioned viewpoint, the isocyanate-based curing agent is preferably a xylylene diisocyanate-based compound. Each derivative in the isocyanate-based curing agent may be, for example, an adduct to which trimethylolpropane and the like was added, and may be an isocyanurate form. The adduct to which trimethylolpropane was added can further increase the reaction rate between the isocyanate group and the hydroxyl group, and it tends to become easier to obtain adhesion between the film base material 1 and the matte layer 2.

The molecular weight of the isocyanate-based curing agent may be 100 to 2,000, or may be 300 to 1,000. By the molecular weight of the isocyanate-based curing agent being in this range, the reaction between Component (A) and the hydroxyl group of Component (C) tends to progress satisfactorily, and the antistatic effect is obtained, and excessive bleeding tends to be easily suppressed.

Antistatic Agent Having a Hydroxyl Group (C)

The antistatic agent which is Component (C) has a hydroxyl group, and the hydroxyl group can react with the isocyanate group of the isocyanate-based curing agent that did not react with the hydroxyl group of the polyol resin. For example, a quaternary ammonium salt, a polymer-metal salt composite, a conductive polymer and the like can be used as the antistatic agent having a hydroxyl group. The hydroxyl equivalent (mass (g) of the antistatic agent containing one equivalent of the hydroxyl group) of the antistatic agent which is Component (C) is preferably 100 to 1,000 g/eq, and more preferably 200 to 900 g/eq, and even more preferably 300 to 800 g/eq. By the hydroxyl equivalent being 100 g/eq or greater, the compatibility between Component (A), Component (B), the solvent and Component (C) tends to improve. By the hydroxyl equivalent being 1,000 g/eq or less, the reactivity improves and excessive bleeding tends to be easily suppressed. The molecular weight of the antistatic agent which is Component (C) is preferably 200 to 20,000, and more preferably 250 to 10,000. By the molecular weight being 200 or greater, there is the tendency that excessive bleeding can be better suppressed. By the molecular weight being 20,000 or less, the antistatic effect tends to be easily obtained. The antistatic agent which is Component (C) preferably has 1 to 100 hydroxyl groups, and more preferably 2 to 50. By the number of hydroxyl groups within the molecule being 1 or greater, the opportunities for reacting the hydroxyl group of the antistatic agent with the isocyanate group increase, and there is the tendency that excessive bleeding can be suppressed. By the number of hydroxyl groups within the molecule being 100 or less, the compatibility between Component (A) and Component (B) and the solvent tends to improve.

The antistatic agent having a hydroxyl group further preferably contains a quaternary ammonium salt, from the viewpoint of obtaining good antistatic properties. The quaternary ammonium salt is composed of a quaternary ammonium cation $(R_{4-a}R'_aN^+)$ and one or a plurality of anions (X−), so that conductivity can be imparted to the matte layer 2. At this time, for example, $Cl^-$, $Br^-$, $I^-$, $F^-$, $HSO_4^-$, $SO_4^{2-}$, $NO_3^-$, $PO_4^{3-}$, $HPO_4^{2-}$, $H_2PO_4^-$, $SO_3^-$, $OH^-$ and the like can be provided as $X^-$. R and R' in the quaternary ammonium cation represent the respective substituents. R represents, for example, an alkyl group having in the range of 1 to 20 carbon atoms. R' is a polymer compound group, and the polymer compound group preferably has a hydroxyl group. For example, a polyoxyalkylene-based polymer compound group, a polyester-based polymer compound group and an alkyl-based polymer compound group may be provided as the polymer compound group a represents an integer from 1 to 4.

Further, the quaternary ammonium salt is preferably provided as an acrylic material containing a quaternary ammonium salt as a functional group in the molecule. For example, a compound obtained by esterifying a portion of the hydroxyl groups of a polyhydric alcohol in (meth) acrylic acid, and a urethane (meth)acrylate compound synthesized from diisocyanate, etc., and the hydroxy ester obtained from the polyhydric alcohol and the (meth) acrylic acid can be used as the acrylic material.

Further, the antistatic agent which is Component (C) is preferably a metal salt-polymer composite from the viewpoint of obtaining good transparency, or reducing the temperature dependence of the antistatic effect. The metal salt-polymer composite is a composite of a metal salt and a polymer compound. An alkali metal salt such as a Li salt and a Group 2 element salt such as Mg and the like can be provided as the metal salt. A polyalkylene oxide, a polyalkyl and the like can be provided as the polymer compound. The polymer compound preferably has a hydroxyl group.

By the antistatic agent having a hydroxyl group, the antistatic agent having a hydroxyl group is bound with the isocyanate-based curing agent, and can suppress bleeding of the antistatic agent. In addition, the configuration of the antistatic agent having a hydroxyl group is determined in order that the properties such as the hydroxyl equivalent can be controlled, from the viewpoints of the antistatic effect and the bleed suppression.

Fine Particles (D)

The resin composition forming the matte layer 2 preferably further contains fine particles (D). The fine particles can be inorganic fine particles or organic fine particles. Silica, clay, talc, calcium carbonate, calcium sulfate, barium sulfate, aluminum silicate, titanium oxide, synthetic zeolite, alumina, smectite and the like can be provided as the inorganic fine particles. Styrene resin, urethane resin, benzoguanamine resin, silicone resin, acrylic resin and the like can be provided as the organic fine particles. Among these, organic fine particles are preferably used from the viewpoints that spherical particles are easily obtained, and the uneven shape of the surface of the matte layer 2 is easily controlled. Only one type of fine particle may be used, or a plurality of types may be used in combination. The average particle size of the fine particles is preferably 0.5 to 30 μm, and more preferably 1 to 20 μm. The average particle size being within the above range is sufficient for scattering the light on the surface of the matte layer 2, and, there is the tendency to impart an unevenness which is controlled so that other members are not damaged.

Other than the abovementioned Components (A) to (D), the resin composition forming the matte layer 2 may contain additives such as a solvent, a leveling agent and lubricants, and different resins, etc., than Component (A).

The resin composition preferably contains 1 to 30 parts by mass of Component (B) relative to 100 parts by mass of Component (A), and more preferably 3 to 20 parts by mass. By containing 1 part by mass or more of Component (B), the isocyanate group which does not react with Component (A) remains, and tends to be able to suppress excessive bleeding of the antistatic agent which is Component (C). Further, by containing 30 parts by mass or less of Component (B), excessive capturing of Component (C) by the isocyanate group can be suppressed, and Component (C) can be unevenly distributed to the surface of the matte layer 2, thus, even better antistatic properties tend to be obtainable. The resin composition preferably contains 1 to 50 parts by mass of Component (C) relative to 100 parts by mass of Component (A), and more preferably 3 to 40 parts by mass. By containing 1 part by mass or more of Component (C), there is a tendency that satisfactory antistatic properties can be easily obtained. By containing 50 parts by mass or less of Component (C), excessive bleeding tends to be suppressed. When the resin composition contains Component (D), it is preferably 2 to 200 parts by mass relative to 100 parts by mass of Component (A), and more preferably 5 to 50 parts by mass. By containing 2 parts by mass or more of Component (D), there is the tendency that an unevenness can be easily obtained on the surface of the matte layer 2. By containing 200 parts by mass or less of Component (D), there is the tendency that damage to other members in contact with the matte layer 2 can be suppressed.

The surface resistivity of the matte layer 2 is preferably $1.0 \times 10^{13}$ Ω/sq. or less, and more preferably $5.0 \times 10^{12}$ Ω/sq. or less, and even further preferably $1.0 \times 10^{12}$ Ω/sq. or less. When the surface resistivity is $1.0 \times 10^{13}$ Ω/sq. or less, it is deemed that a sufficient antistatic effect can be obtained.

The thickness excluding the protrusions of the matte layer 2 is preferably 0.1 to 20 μm, and more preferably 0.3 to 10 μm. By the thickness of the matte layer 2 being 0.1 μm or greater, a uniform film tends to be obtained and the optical functions tend to be sufficiently obtained. However, by the thickness of the matte layer 2 being 20 μm or less, when using the fine particles, the fine particles are exposed to the surface of the matte layer 2, which tends to make it easier to obtain the unevenness imparting effect.

A film including numerous organic polymers can be used as the film base material 1. The film base material 1 may be a transparent film base material which is normally used, for example, in an optical member such as a display, and a base material including numerous organic polymers can be used considering optical properties such as the transparency and the refraction index, and furthermore, various physical properties such as impact resistance, heat resistance and durability. For example, polyolefins, polyesters, celluloses, polyamides, acryls, and other polymer compounds can be used as the organic polymer. Polyethylene, polypropylene and the like can be provided as the polyolefin polymer compound. Polyethylene terephthalate, polyethylene naphthalate and the like can be provided as the polyester polymer compound. Triacetyl cellulose, diacetyl cellulose, cellophane and the like can be provided as the cellulose polymer compound. Nylon 6 and nylon 6,6 and the like can be provided as the polyamide polymer compound. Polymethyl methacrylate and the like can be provided as the acryl polymer compound. Polystyrene, polyvinyl chloride, polyimide, polyvinyl alcohol, polycarbonate, ethylene vinyl alcohol and the like can be used as the other polymer compounds.

The thickness of the film base material 1 is preferably 5 to 300 μm. By the thickness of the film base material being 5 μm or greater, the strength of the film base material 1 can be obtained, and the handling during the backlight assembly process tends to become easy. However, by the thickness of the film base material 1 being 300 μm or less, the handling becomes easy when applied in a roll-to-roll manner.

Next, the method for manufacturing the optical film 10 will be explained. The method for manufacturing of the optical film 10 includes the steps of coating the resin composition on the film base material 1, and heating the resin composition after coating to form the matte layer 2 on the film base material 1. In the coating step, the resin composition (the matte layer composition) is coated on the film base material 1 and a coating film is formed. A roll coater, a reverse roll coater, a gravure coater, a micro gravure coater, a knife coater, a bar coater, a wire bar coater, a die coater, a dip coater, and the like can be used as the method for coating the matte layer composition on the film base material 1.

After coating the matte layer composition on the film base material 1, the solvent within the coating film is removed by drying the coating film. At this time, drying, blowing, hot air and the like may be used as the drying means. After drying the coating film, the matte layer 2 is formed on the film base material 1 by further heating the dried coating film.

Figure 2:
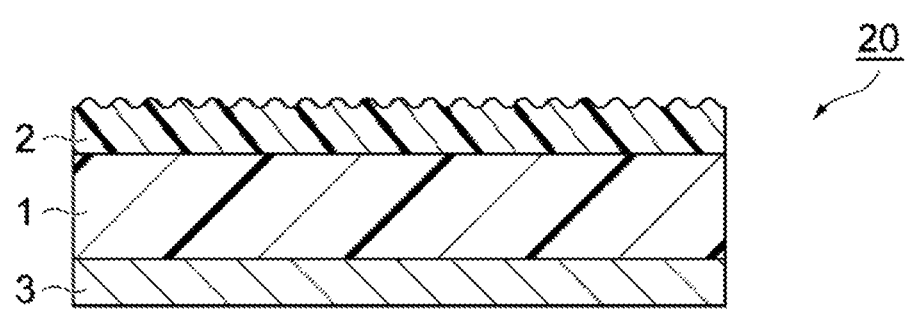
FIG. 2 is a schematic cross-sectional view of the optical barrier film according to an embodiment of the present invention.

FIG. 2 is a schematic cross-sectional view of the optical barrier film according to an embodiment of the present invention. In FIG. 2, the optical barrier film 20 includes the film base material 1, the matte layer 2 formed on one surface of the film base material 1, and the vapor deposition film layer 3 formed on the other surface of the film base material 1.

In the present embodiment, the vapor deposition film layer 3 is formed by vapor deposition on the other surface of the film base material 1. The vapor deposition film layer 3 contains a metal oxide. For example, oxides of aluminum, copper, silver, yttrium, tantalum, silicon, and magnesium, etc., may be provided as the metal oxide. The metal oxide is preferably silicon oxide ($SiO_x$, x is 1.0 to 2.0) because silicon oxide is inexpensive and the barrier properties are excellent. If x is 1.0 or greater, a good barrier property tends to be easily obtained. The thickness of the vapor deposition film layer 3 is, for example, 10 to 500 nm. The vapor deposition film layer 3 may be disposed on the side opposite to the matte layer 2 of the film base material 1, and does not have to be directly formed on the surface of the film base material 1.

By forming the matte layer 2 on the surface of the side of the film base material 1 on which the vapor deposition film layer 3 is not formed in the same manner as stated above, the optical barrier film of the present embodiment can be obtained. Namely, the formation method of the optical barrier film 20 of the present embodiment includes the steps of forming the vapor deposition film layer on a first surface of the film base material 1, coating the resin composition on a second surface of the film base material 1, and heating the resin composition after coating to form the matte layer 2 on the second surface of the film base material 1.

Figure 3:
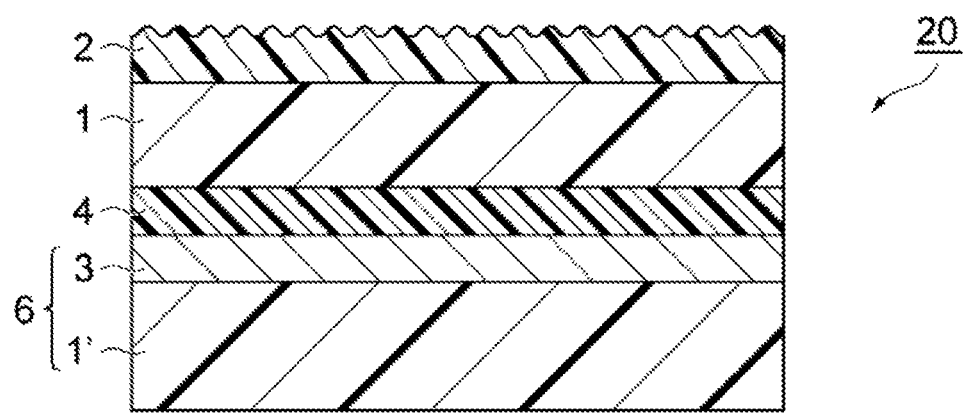
FIG. 3 is a schematic cross-sectional view of the optical barrier film according to another embodiment of the present invention.

FIG. 3 is a schematic cross-sectional view of the optical barrier film according to another embodiment of the present invention. In FIG. 3, the optical barrier film 20 is provided with a film base material 1', a vapor deposition film layer 3 formed on one surface of the film base material 1', a film base material 1 adhered via a sticky layer or an adhesive layer 4 on the vapor deposition film layer 3, and the matte layer 2 formed on the film base material 1. In FIG. 3, the film base material 1' and the vapor deposition film layer 3 formed on the film base material 1' are collectively referred to as the barrier film base material 6. In the present embodiment, the film base material 1' is different from the film base material 1 in FIG. 3, in the point that the matte layer 2 is not formed, but the same type of material as the film base material 1 may be selected for the film base material 1', and the materials may be the same and may be different.

When manufacturing the optical barrier film 20 of the present embodiment, first, an adhesive or a tackifier is coated on the surface of the vapor deposition film layer 3 side of the barrier film base material 6. Furthermore, the film base material 1 is separately affixed on the coating surface, and the coating layer becomes the sticky layer or the adhesive layer 4 by aging in accordance with need. The thickness of the sticky layer or adhesive layer 4 is preferably 1 μm to 20 μm. Adhesives or tackifiers for polymer films can be generally used as the adhesive or the tackifier. As the adhesive or the tackifier, polyester-based, acrylic-based, rubber-based, phenol-based, urethane-based, etc., adhesives or tackifiers may be provided. The formation method of the matte layer 2 is the same as stated above. Namely, the manufacturing method of the optical barrier film 20 of the present embodiment includes the steps of coating the adhesive or the tackifier on the surface of the vapor deposition film layer 3 side of the barrier film base material 6, aging by affixing the film base material 1 on the barrier film base material 6 via the adhesive or the tackifier after coating, coating the resin composition on the surface of the side opposite to the barrier film base material 6 of the film base material 1, and heating the resin composition after coating to form the matte layer 2 on the surface of the side opposite to the barrier film base material 6 of the film base material 1.

Figure 4:
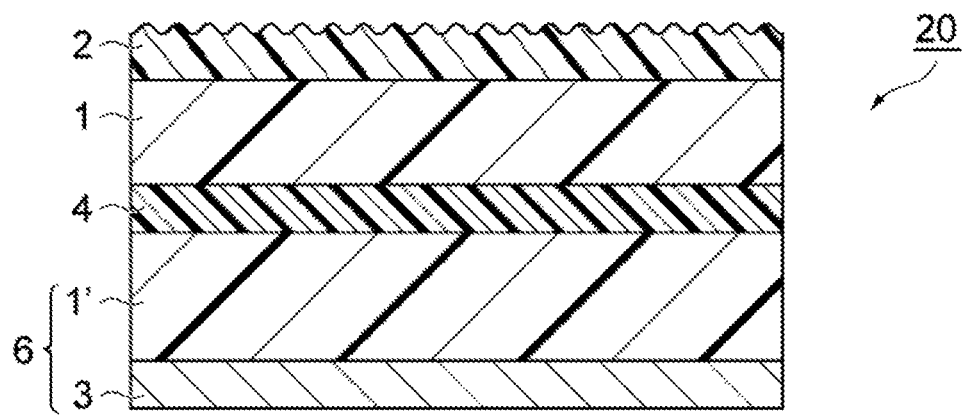
FIG. 4 is a schematic cross-sectional view of the optical barrier film according to another embodiment of the present invention.

FIG. 4 is a schematic cross-sectional view of the optical barrier film according to another embodiment of the present invention. In FIG. 4, the optical barrier film 20 is provided with the film base material 1', the vapor deposition film layer 3 formed on one surface of the film base material 1', the film base material 1 adhered via the sticky layer or the adhesive layer 4 formed on the other surface of the film base material 1' and the matte layer 2 formed on the film base material 1. In FIG. 4, the film base material 1' and the vapor deposition film layer 3 formed on the film base material 1' are collectively referred to as the barrier film base material 6. In the present embodiment, the film base material 1 and the film base material 1' may be the same or may be different. The formation method of the matte layer 2, the formation method of the vapor deposition film layer 3, and the method for adhering to the barrier film base material 6 of the film base material 1 are the same as stated above. Namely, the manufacturing method of the optical barrier film 20 of the present embodiment includes the steps of coating the adhesive or the tackifier on the surface of the side opposite to the vapor deposition film layer 3 of the barrier film base material 6, aging by affixing the film base material 1 on the barrier film base material 6 via the adhesive or the tackifier after coating, coating the resin composition on the surface of the side opposite to the barrier film base material 6 of the film base material 1, and heating the resin composition after coating to form the matte layer 2 on the surface of the side opposite to the barrier film base material 6 of the film base material 1.

Figure 5:
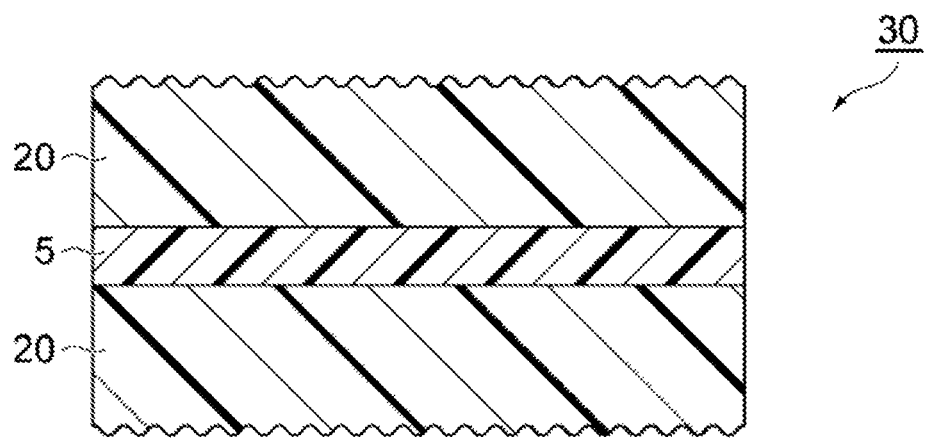
FIG. 5 is a schematic cross-sectional view of the color conversion film according to an embodiment of the present invention.

FIG. 5 is a schematic cross-sectional view of the color conversion film according to an embodiment of the present invention. In FIG. 5, a color conversion film 30 is provided with a color conversion layer 5 and a pair of optical barrier films 20 formed on both surfaces of the color conversion layer 5. In FIG. 5, the optical barrier film 20 is used in both of the optical barrier films, but the optical barrier film 20 may be used on only one side.

The color conversion layer 5 contains resin and a phosphor. The thickness of the color conversion layer 5 is several tens to hundreds μm. For example, a photocurable resin or a thermosetting resin can be used as the resin. A core-shell quantum dot having a good luminous efficiency is preferably used as the phosphor. The core-shell quantum dot coats a semiconductor crystal core as a light emitting part with a shell as a protective film. For example, cadmium selenide (CdSe) may be used in the core and zinc sulfide (ZnS) may be used in the shell.

After coating a phosphor dispersion prepared by dispersing the phosphor in resin on the surface of the side opposite to the matte layer 2 of one of the optical barrier films 20, the color conversion layer 5 is formed by affixing the other optical barrier film 20 to the coating surface and curing the coating layer.

The color conversion film 30 of the present embodiment can be preferably used in a backlight unit in which a blue LED (light emitting diode) is provided as the light source.

Figure 6:
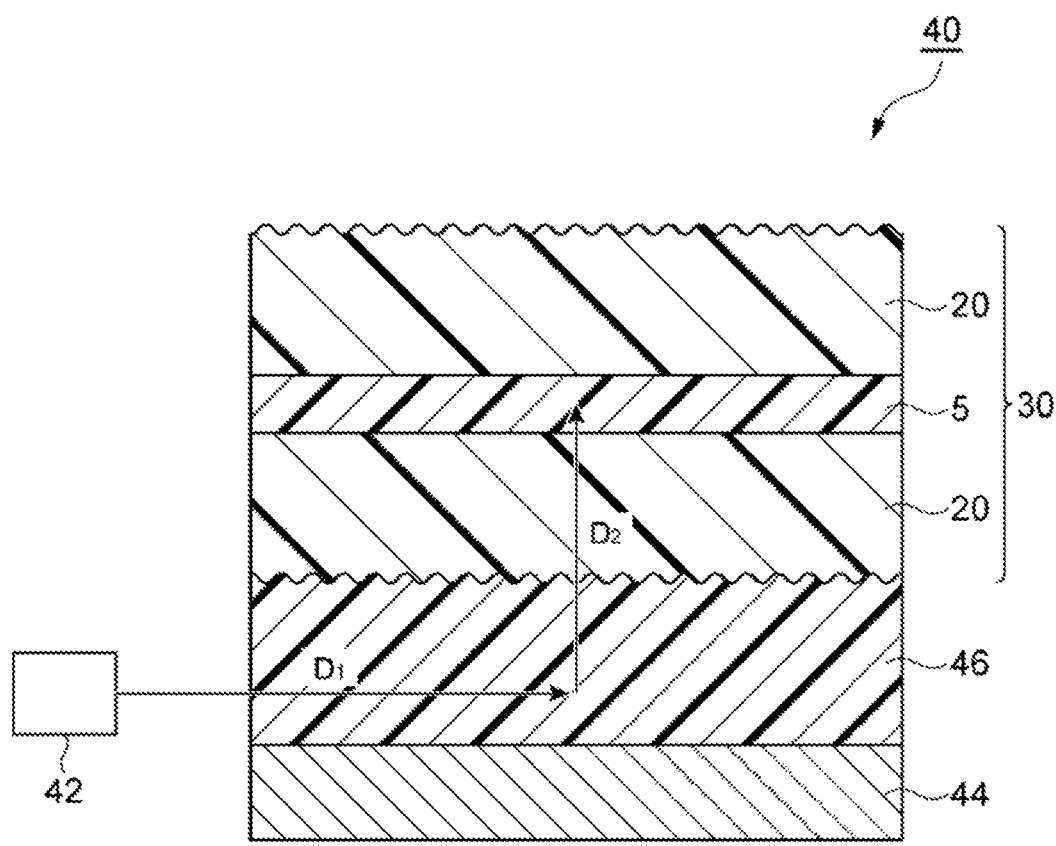
FIG. 6 is a schematic cross-sectional view of a backlight unit obtained by using the color conversion film according to an embodiment of the present invention.

FIG. 6 is a schematic cross-sectional view of a backlight unit obtained by using the color conversion film according to an embodiment of the present invention. In FIG. 6, a backlight unit 40 is provided with a light source 42, a light guide plate 46 and a color conversion film 30 disposed on the light guide plate 46. The color conversion film 30 is arranged so that an uneven surface (i.e., the uneven surface of the matte layer 2) is in contact with the light guide plate 46. In detail, in the backlight unit 40, the light guide plate 46 and the reflection plate 44 are arranged in this order on the uneven surface of the color conversion film 30, and the light source 42 is arranged on one side of the light guide plate 46 (the surface direction of the light guide plate 46). In the backlight unit 40, as excessive bleeding of the antistatic agent to the uneven surface of the color conversion film 30 can be suppressed, it is possible to suppress appearance defects or the transfer of the antistatic agent to other members, and furthermore, it is possible to obtain a sufficient antistatic effect over a long period of time.

The light guide plate 46 and the reflection plate 44 efficiently reflect and guide the light irradiated from the light source 42, and well-known materials are used. For example, acrylic, polycarbonate, and cycloolefin film may be used as the light guide plate 46. For example, a plurality of blue light emitting diode elements are provided in the light source 42. The light emitting diode elements may be a green light emitting diode or even a light emitting diode of a lower wavelength. The light irradiated from the light source 42 is made incident on the light guide plate 46 (D1 direction), and then is incident on the color conversion layer 5 (D2 direction) along with reflection and refraction. The light which passes through the color conversion layer 5 becomes white light by the yellow light generated in the color conversion layer 5 being mixed into the light prior to passing through the color conversion layer 5.

EXAMPLES

The present invention will be substantially described below by way of examples, but the present invention is not limited to these Examples.

[Production of the Optical Film]

Example 1

The materials shown below were mixed and the matte layer composition was prepared. The matte layer composition was coated on a transparent film base material (thickness: 25 μm, polyethylene terephthalate film, Trade name: Teijin Tetoron Film HPE, manufactured by DuPont Teijin Films U.S. Limited Partnership) by a wire bar coater, the coating film was dried at 80° C. for 30 seconds, a matte layer having a thickness of 3 μm was formed on the transparent film base material by aging at 50° C. for 72 hours, and the optical film was produced.

Acrylic polyol resin (manufactured by DIC Corporation, Trade name: Acrydic A-814) 100 parts by mass Isocyanate-based curing agent (manufactured by DIC Corporation, Trade name: Burnock DN-980, hexamethylene diisocyanate compound) 8.5 parts by mass Antistatic agent (quaternary ammonium salt, manufactured by DKS Co. Ltd., Trade name: Resistat PU-101, hydroxyl equivalent: 316.1 g/eq) 10 parts by mass Fine particles (polyurethane, average particle size: 2 μm) 10 parts by mass Solvent (ethyl acetate) 70 parts by mass Example 2 and 3 and Comparative Examples 1 to 4

With the exception of using the antistatic agents shown in the following Table 1 in place of the 10 parts by mass of Resistat PU-101 as the antistatic agent, the matte layer composition was prepared in the same manner as Example 1, and the optical film was produced.

Example 4 and 5

With the exception of using the isocyanate-based curing agents shown in the following Table 2 in place of Burnock DN-980 as the isocyanate-based curing agent, the matte layer composition was prepared in the same manner as Example 1, and the optical film was produced.

Comparative Example 5

With the exception of using the isocyanate-based curing agents shown in the following Table 2 in place of Burnock DN-980 as the isocyanate-based curing agent, the matte layer composition was prepared in the same manner as Comparative Example 4, and the optical film was produced.

[Evaluation Method]

Each of the optical films produced by the Examples and the Comparative Examples was evaluated in accordance with the following methods.

(Surface Resistivity)

A high resistance resistivity meter (manufactured by Dia Instruments Co. Ltd., Hiresta-MCP-HT260) was used in accordance with JIS-K6911 to measure the surface resistivity of the matte layer of each of the optical films obtained by the Examples and the Comparative Examples. The measurement results are shown in Table 1 or 2.

(Bleed Out to the Matte Layer Surface)

Each of the optical films obtained by the Examples and the Comparative Examples was maintained under an environment having a temperature of 65° C. and a relative humidity of 95%, and then removed and placed in a normal temperature environment. The matte layer surface of each of the removed optical films was observed visually. The observation results were evaluated according to the following criteria. The evaluation results are shown in Table 1 or 2.

A: No uneven appearance caused by bleeding was recognized.

B: An uneven appearance caused by bleeding was recognized.

C: A remarkable uneven appearance caused by bleeding was recognized.

(Transfer of Bled Matter)

Each of the optical films obtained by the Examples and the Comparative Examples was maintained under an environment having a temperature of 65° C. and a relative humidity of 95% for 1000 hours, and then removed and placed in a normal temperature environment. Each of the removed optical films was stacked on the polycarbonate film having a thickness of 188 μm formed as a light guide plate of the backlight unit so that the matte layer was in contact with the polycarbonate film, a load of 25 kgf/cm2 was applied to the films and left standing for 30 seconds. Then, the polycarbonate film was peeled from each of the optical films, and the polycarbonate film surfaces (peeling surface) were observed visually after being peeled. The observation results of the surface were evaluated according to the following criteria. The evaluation results are shown in Table 1 or 2.

A: No transfer of bled matter was recognized.

B: Transfer of bled matter was recognized.

C: Remarkable transfer of bled matter was recognized.

(Adhesion)

Each of the optical films obtained by the Examples and the Comparative Examples was maintained in an environment having a temperature of 65° C. and a relative humidity of 95% for 1000 hours, and then removed and placed in a normal temperature environment. A cross-cut test of 100 grids was performed to the surface of the matte layer side of each of the removed optical films in accordance with JIS K 5400, and the number of grids of the grid pattern matte layer remaining unbroken on the film base material was counted. The adhesion of the matte layer and the film base material of each of the optical films was evaluated according to the following criteria. The evaluation results of the number of grids remaining and the adhesion are shown in Table 1 or 2.

A: The proportion of the grid pattern matte layer remaining unbroken on the film base material was 100%.

B: The proportion of the grid pattern matte layer remaining unbroken on the film base material was 50 or more to less than 100%.

C: The proportion of the grid pattern matte layer remaining unbroken on the film base material was less than 50%.

(Light-Fastness)

UV light from the matte layer side was irradiated for 100 hours onto each of the optical films obtained by the Examples and the Comparative Examples using an Ultraviolet Auto Fade Meter (manufactured by Suga Test Instrument Co. Ltd., U48AU) having a UV light carbon arc as the light source. An automatic spectrophotometer (manufactured by Hitachi Ltd., U-4100) was used to create a transmission spectrum of each of the optical films before and after UV irradiation, and the transmittance of UV light having a wavelength of 450 nm was measured. The yellow discoloration before and after UV irradiation was evaluated according to the following criteria, and the evaluation results of the yellow discoloration were deemed to be the evaluation results of light-fastness. The evaluation results are shown in Table 1 or 2.

A: The decrease in transmittance before and after UV irradiation was less than 1%.

B: The decrease in transmittance before and after UV irradiation was 1% or more to less than 3%.

C: The decrease in transmittance before and after UV irradiation was 3% or more.

TABLE 1

| | Antistatic agent | | Amount of addition relative to 100 parts by mass of polyol resin | Surface resistivity ($\Omega$/sq.) | Bleed out | | Adhesion (Number of remaining grids) | Light-fastness |
|---|---|---|---|---|---|---|---|---|
| | | Hydroxyl equivalent (g/eq) | | | Matte layer surface | Transfer | | |
| Example 1 | Resistat PU-101 | 316.1 | 10 parts by mass | $4.5 \times 10^9$ | A | A | B (98) | A |
| Example 2 | Ethoquad C/25 | 334.5 | 20 parts by mass | $2.2 \times 10^{12}$ | A | A | B (88) | A |
| Example 3 | PEL-25 | 758.1 | 30 parts by mass | $6.2 \times 10^{11}$ | A | A | B (90) | A |
| Comp. Ex. 1 | Light ester DQ100 | — | 4 parts by mass | $>1.0 \times 10^{14}$ | A | A | B (66) | A |
| Comp. Ex. 2 | Light ester DQ100 | — | 10 parts by mass | $3.8 \times 10^{12}$ | C | C | B (54) | A |
| Comp. Ex. 3 | Dimethyldistearylammonium chloride | — | 4 parts by mass | $>1.0 \times 10^{14}$ | B | A | B (63) | A |
| Comp. Ex. 4 | Dimethyldistearylammonium chloride | — | 10 parts by mass | $8.5 \times 10^{11}$ | C | C | B (57) | A |

The details of the antistatic agent in Table 1 are as follows.

Ethoquad C/25: manufactured by Lion Specialty Chemicals Co., Ltd., quaternary ammonium salt (hydroxyl equivalent: 334.5 g/eq)

PEL-25: manufactured by Japan Carlit Co., Ltd., polymer-Li salt composite (hydroxyl equivalent: 758.1 g/eq)

Light ester DQ100: manufactured by Kyoeisha Chemical Co., Ltd, quaternary ammonium salt (No hydroxyl group)

Dimethyldistearylammonium chloride: manufactured by Tokyo Chemical Industry Co., Ltd. (No hydroxyl group)

TABLE 2

| | Antistatic agent | Isocyanate-based curing agent | Surface resistivity ($\Omega$/sq.) | Bleed out | | Adhesion (Number of remaining grids) | Light-fastness |
|---|---|---|---|---|---|---|---|
| | | | | Matte layer surface | Transfer | | |
| Example 1 | Resistat PU-101 | Burnock DN-980 | $4.5 \times 10^9$ | A | A | B (98) | A |
| Example 4 | Resistat PU-101 | Takenate D-110N | $5.8 \times 10^9$ | A | A | A (100) | A |
| Example 5 | Resistat PU-101 | Takenate D-101A | $9.3 \times 10^9$ | A | A | A (100) | B |
| Comp. Ex. 5 | Dimethyldistearylammonium chloride | Takenate D-101A | $6.4 \times 10^{11}$ | C | C | A (100) | C |

The details of the isocyanate-based curing agents in Table 2 are as follows.

Takenate D-110N: manufactured by Mitsubishi Chemical Inc., xylylene diisocyanate-based compound (trimethylolpropane adduct).

Takenate D-101A: manufactured by Mitsubishi Chemical Inc., toluene diisocyanate compound.

By using the antistatic agents having a hydroxyl group as in Examples 1 to 5, the optical film in which the antistatic properties (low surface resistivity) were compatible with bleed suppression could be obtained. As in these Examples, the optical film in which the antistatic properties were compatible with bleed suppression can be preferably used even as the materials of an optical barrier film and a color conversion film. Further, while the light-fastness deteriorates slightly compared to Example 1 by using an aromatic isocyanate as the isocyanate-based curing agent as in Example 5, an optical film in which the adhesion was excellent could be obtained. Furthermore, by using an aliphatic isocyanate having an aromatic ring as the isocyanate-based curing agent as in Example 4, an optical film having a good balance of light-fastness and adhesion could be obtained.

INDUSTRIAL APPLICABILITY

The optical film, the optical barrier film and the color conversion film of the present invention can be used as members constituting a backlight unit which uses a light source composed of a blue LED.

REFERENCE SIGNS LIST

1 . . . film base material, 2 . . . matte layer, 3 . . . vapor deposition film layer, 4 . . . sticky layer or adhesive layer, 5 . . . color conversion layer, 10 . . . optical film, 20 . . . optical barrier film, 30 . . . color conversion film.

What is claimed is:

1. An optical barrier film comprising:
(i) an optical film comprising
   (a) a film base material and
   (b) a matte layer formed on one surface of the film base material,
wherein the matte layer is formed from a resin composition containing a polyol resin (A), an isocyanate-based curing agent (B) and an antistatic agent having a hydroxyl group (C); and
(ii) a vapor deposition film layer disposed on a surface of the optical film opposite to the surface facing the matte layer of the film base material,
wherein the vapor deposition film layer contains metal oxide, wherein the resin composition further contains fine particles (D) having an average particle size of 1 to 20 μm wherein the isocyanate-based curing agent (B) is a xylylene diisocyanate-based compound, wherein the antistatic agent comprises a quarternary ammonium salt, wherein a hydroxyl equivalent mass of the antistatic agent is 300 to 800 g/eq and wherein a surface resistivity of the matte layer is $1.0 \times 10^{13} \Omega/sq$ or less, and wherein the quaternary ammonium salt is composed of a quaternary ammonium cation, $R_{4-a}R'_aN^+$, and one or more of anions $X^-$ selected from $Cl^-$, $Br^-$, $I^-$, $F^-$, $HSO_4^-$, $SO_4^{2-}$, $NO_3^-$, $PO_4^{3-}$, $HPO_4^{2-}$, $H_2PO_4^-$, $SO_3^-$, $OH^-$ and wherein R an alkyl group having in the range of 1 to 20 carbon atoms, and R' is a polymer compound group, having hydroxyl groups, and wherein a represents an integer from 1 to 4.

2. The optical barrier film of claim 1, wherein the metal oxide includes silicon oxide.

3. The optical barrier film of claim 1, wherein the fine particles are urethane resin particles.

4. A color conversion film comprising:
a color conversion layer; and
a pair of optical barrier films formed on opposite surfaces of the color conversion layer, wherein
at least one of the optical barrier films is the optical barrier film of claim 1.

* * * * *